United States Patent [19]
Takagi et al.

[11] Patent Number: 5,384,587
[45] Date of Patent: Jan. 24, 1995

[54] MULTI-DROP INK-JET RECORDING METHOD WITH COMPENSATION FOR IMAGE DENSITY NON-UNIFORMITIES

[75] Inventors: Shinji Takagi, Kawasaki; Hideki Tanaka, Yokohama; Tatsuo Kimura, Kawasaki; Jun Ashiwa, Yokohama, all of Japan

[73] Assignee: Canon Kabushiki Kaisha, Tokyo, Japan

[21] Appl. No.: 893,070

[22] Filed: Jun. 3, 1992

[30] Foreign Application Priority Data

Jun. 7, 1991 [JP] Japan .................. 3-136575

[51] Int. Cl.⁶ .................................................. B41J 2/01
[52] U.S. Cl. ...................................................... 347/41
[58] Field of Search .................. 346/140 R, 1.1, 75; 400/126; 347/41

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,509,058 | 4/1985 | Fischbeck | 346/1.1 |
| 4,558,333 | 12/1985 | Sugitani et al. | 346/140 R |
| 4,622,561 | 11/1986 | Koike | 346/1.1 |
| 4,686,538 | 8/1987 | Kouzato | 346/1.1 |
| 4,703,323 | 10/1987 | Troupes et al. | 340/790 |
| 4,723,129 | 2/1988 | Endo et al. | 346/1.1 |
| 4,740,796 | 4/1988 | Endo et al. | 346/1.1 |
| 4,864,326 | 9/1989 | Kawamura et al. | 346/108 |
| 4,999,646 | 3/1991 | Trask | 346/1.1 |
| 5,051,755 | 9/1991 | Takahashi et al. | 346/76 PH |
| 5,075,689 | 12/1991 | Hoisington et al. | 346/1.1 |

FOREIGN PATENT DOCUMENTS

| | | |
|---|---|---|
| 0259541 | 3/1988 | European Pat. Off. |
| 0300595 | 1/1989 | European Pat. Off. |
| 0376596 | 7/1990 | European Pat. Off. |
| 0422870 | 4/1991 | European Pat. Off. |
| 0011532 | 2/1978 | Japan .................. 346/140 |
| 54-056847 | 5/1979 | Japan |
| 0042836 | 3/1980 | Japan .................. 346/75 |
| 59-123670 | 7/1984 | Japan |
| 59-138461 | 8/1984 | Japan |
| 60-071260 | 4/1985 | Japan |

*Primary Examiner*—Benjamin R. Fuller
*Assistant Examiner*—N. Le
*Attorney, Agent, or Firm*—Fitzpatrick, Cella, Harper & Scinto

[57] ABSTRACT

After an ink-jet recording head with a plurality of discharging portions arranged is main-scanned in a direction perpendicular to the direction of the discharging portion arrangement to record a first image area, sub-scanning of the head is performed. Before the head is main-scanned to record a second image area, the sub-scanning is performed so that a few discharging portions on an upper edge portion of the head in second main-scanning overlap part of the first image area. Ink droplets land on pixels in the overlapping portion twice for each main-scanning, and image density of the pixels in the overlapping portion is controlled by the sum number of the landing ink droplets. This enables image density unevenness of image density, example, a "black stripe (banding)" or a "white stripe (banding)" in a boundary of an image area being recorded in each main-scanning, to be markedly reduced.

16 Claims, 17 Drawing Sheets

MULTI-DROP INK-JET RECORDING METHOD WITH COMPENSATION FOR IMAGE DENSITY NON-UNIFORMITIES

BACKGROUND OF THE INVENTION

1. Field of the Invention

The present invention relates to an ink-jet recording method for generating clear images by using a recording apparatus including an ink-jet recording head having a plurality of orifices.

2. Description of the Related Art

In an ink-jet recording method for recording images on a recording medium such as a recording sheet by moving (main-scanning) an ink-jet recording head with a plurality of orifices relative to the recording medium, a so-called multi-droplet method has been conventionally used for representing a tone wedge of a recording image. In the multi-droplet method, a plurality of ink droplets are landed or deposited on substantially the same position on a recording medium, and a pixel having an area according to the number of the plurality of ink droplets is formed. In this case, the tone wedge of the recording image is represented by forming a pixel having an area according to the image data.

When the multi-droplet method is used for recording images, all the images are generally recorded in such a way that the recording head is moved (main-scanning) relative to a recording medium for recording a part of the images, and then the recording head is moved (sub-scanning) perpendicularly to the direction of main-scanning and the main-scanning is carried out for recording another part of the images. That is, the main-scanning and the sub-scanning are carried out by turns so that all the images are recorded on the recording medium. In the conventional ink-jet recording method, the above feed distance of the recording head in the sub-scanning direction is a distance between two orifices provided on the recording head or a distance determined by the product of an orifice pitch and the number of orifices.

In the conventional ink-jet recording method, since, however, the feed distance in the sub-scanning direction is determined as the above described distance value, a portion not recorded of a so-called "white stripe (banding)" is generated in a recording image when an actual feed distance is greater than the predetermined distance value. On the other hand, when the actual feed distance is smaller than the predetermined value, there is a problem that ink droplets, the number of which is about twice as large as the number of ink droplets forming a predetermined pixel, land on the same position and a portion of a so-called "black stripe (banding)" of an extremely high image density is generated. In order to solve these problems, the feed distance in the sub-scanning direction may be precisely controlled so as to be always constant under any condition. However, this causes a very expensive manufacturing cost of the ink-jet recording apparatus.

Moreover, in the ink-jet recording head, volume of one ink droplet, which is discharged from one orifice in a vicinity of an edge portion of orifices disposed in a row, may fluctuate due to a temperature distribution in the use of the ink-jet recording head or unevenness of products caused by manufacturing and machining processes. As a result, in an image area, recorded in one main-scanning, unevenness of the image density may occur between portions recorded by the orifices in the vicinity of the edge portions of the recording head and portions recorded by other orifices.

As described above, in the conventional ink-jet recording method, the image quality in a vicinity of a boundary between an image area recorded in main-scanning and an image area recorded in next main-scanning may deteriorate for the above reasons.

SUMMARY OF THE INVENTION

It is an object of the present invention to solve the above problems.

It is another object of the present invention to markedly reduce unevenness of an image density, a "black stripe" or a "white stripe" generated in a vicinity of a boundary between an image area formed in main-scanning and an image area formed in next main-scanning by simple control.

It is further object of the present invention to improve image quality of image areas including the boundary.

For this purpose, in a first aspect of the present invention, there is provided an ink-jet recording method, in which a plurality of ink droplets for each pixel are overlapped and landed on a recording medium to form each pixel by a recording head with a plurality of ink discharging portions arranged thereon and a tone wedge of an image data is represented by controlling an area of each pixel on a basis of the number of the plurality of ink droplets, comprising the steps of:

- recording one image area by main-scanning of the recording head and the recording medium relative thereto in a direction other than a direction of the ink discharging portion arrangement;
- sub-scanning the recording head and the recording medium relative thereto in a direction perpendicular to a direction of the main-scanning; and
- recording the following image area by main-scanning the recording head and the recording medium relative thereto,
- wherein the sub-scanning is performed in a manner that part of the one image area overlaps part of the following image area, and the number of ink droplets discharged from at least one ink discharging portion of the plurality of ink discharging portions, which relates to recording of pixels included in an overlapping portion of the one and following image areas, is restricted when the one and following image areas are recorded, so that a tone wedge of a recording image of the pixels included in the overlapping portion is represented by a total number of ink droplets being discharged when the one and following image areas are recorded.

The number of discharging portions for recording pixels included in the overlapping portion may be two or more, the number of ink droplets being discharged from the two or more discharging portions for recording the overlapping portion, may be gradually decreased toward a discharging portion disposed in an edge portion of the recording head when the one image area is recorded, and may be gradually increased from a discharging portion disposed in an edge portion of the recording head when the following image area is recorded, so that the total number of discharged ink droplets is obtained.

An ink-jet recording method may further comprise the step of adjusting an amount of the sub-scanning and/or a record starting position of the main-scanning, wherein each pixel included in the overlapping portion may be formed by partially overlapping one image portion being formed by a group of ink droplets discharged when the one image area is recorded with a following image portion being formed by a group of ink droplets discharged when the following image area is recorded, by less than a pixel pitch.

The total number of ink droplets may be the number of ink droplets being determined to obtain a predetermined tone wedge of a recording image off pixels when the pixels are formed without overlapping thereof.

The recording head may comprise heating elements each of which produces thermal energy for discharging ink in response to an electric current.

In a second aspect of the present invention, there is provided an ink-jet recording method, in which a plurality of ink droplets for each pixel are overlapped and landed on a recording medium to form each pixel by a recording head with a plurality off ink discharging portions arranged thereon and a tone wedge of an image data is represented by controlling an area of each pixel on a basis of the number of the plurality of ink droplets, comprising the steps of:
  recording a one image area by main-scanning of the recording head and the recording medium relative thereto in a direction other than a direction of the ink discharging portion arrangement;
  sub-scanning the recording head and the recording medium relative thereto in a direction different from a direction of the main-scanning, by a length less than a width of the one image area; and
  recording a following image area by main-scanning the recording head and the recording medium relative thereto, whereby the one and following image areas are partially overlapped with each other,
  wherein the number of discharging portions for recording pixels included in an overlapping portion of the one and following image areas is two or more, the number of ink droplets being discharged from the two or more discharging portions for recording the overlapping portion, is gradually decreased toward a discharging potion disposed in an edge portion of the recording head when the one image area is recorded, and is gradually increased from a discharging portion disposed in an edge portion of the recording head when the following image area is recorded, so that a total number of discharged ink droplets, being discharged when the one and following image areas are recorded is obtained.

The recording head may comprise heating elements each of which produces thermal energy for discharging ink in response to an electric current.

In a third aspect of the present invention, there is provided an ink-jet recording method, in which a plurality of ink droplets for each pixel are overlapped and landed on a recording medium to form each pixel by a recording head with a plurality of ink discharging portions arranged thereon and a tone wedge of an image data is represented by controlling an area of each pixel on a basis of the number of the plurality of ink droplets, comprising the steps of:
  recording a one image area by main-scanning of the recording head and the recording medium relative thereto in a direction other than a direction of the ink discharging portion arrangement;
  sub-scanning the recording head and the recording medium relative thereto in a direction different from a direction of the main-scanning, by a length less than a width of the one image area;
  recording a following image area by main-scanning the recording head and the recording medium relative thereto, whereby the one and following image areas are partially overlapped with each other; and
  adjusting an amount of the sub-scanning and/or a record starting position of the main-scanning,
  wherein each pixel included in an overlapping portion of the one and following image areas is formed by partially overlapping one image portion being formed by a group of ink droplets discharged when the one image area is recorded with a following image portion being formed by a group of ink droplets discharged when the following image area is recorded, by less than a pixel pitch.

The recording head may comprise heating elements each of which produces thermal energy for discharging ink in response to an electric current.

In a forth aspect of the present invention, there is provided an ink-jet recording method, in which at least one ink droplet for each pixel is landed on a recording medium to form each pixel by a recording head with a plurality of ink discharging portions arranged thereon and a tone wedge of an image data is represented by controlling an area of each pixel on a basis of an quantity of ink based on density data, comprising the steps of:
  recording one image area by main-scanning of the recording head and the recording medium relative thereto in a direction other than a direction of the ink discharging port ion arrangement;
  sub-scanning the recording head and the recording medium relative thereto in a direction perpendicular to a direction of the main-scanning; and
  recording the following image area by main-scanning the recording head and the recording medium relative thereto,
  wherein the sub-scanning is performed in a manner that part of the one image area overlaps part of the following image area and the density data corresponding to at least one discharging portion of the plurality of discharging portions, which relates to recording of pixels included in an overlapping portion of the one and following image areas, is restricted when the one and following image areas are recorded, so that tone wedge of a recording image of the pixels included in the overlapping portion is represented by a total of quantity of ink discharged when the one and following image areas are recorded.

The number of discharging portions for recording pixels included in the overlapping portion may be two or more, the density data corresponding to the two or more discharging portions for recording the overlapping portion, may be gradually decreased toward a discharging portion disposed in an edge portion of the recording head when the one image area is recorded, and may be gradually increased from a discharging portion disposed in an edge portion of the recording head when the following image area is recorded, so that the total of ink quantity is obtained.

The number of ink droplets that may be landed on one pixel may be controlled based on the density data.

The total number of ink droplets may be the number of ink droplets being determined to obtain a predetermined tone wedge of a recording image of pixels when the pixels are formed without overlapping thereof.

The recording head may comprise heating elements each of which produces thermal energy for discharging ink in response to an electric current.

An ink-jet recording method may further comprise the step of adjusting an amount of the sub-scanning and/or a record starting position of the main-scanning, wherein each pixel included in the overlapping portion may be formed by partially overlapping one image portion being formed by a group of ink droplets discharged when the one image area is recorded and a following image portion being formed by a group of ink droplets discharged when the following image area is recorded, by less than a pixel pitch.

The total of ink quantity may be density data being determined to obtain a predetermined tone wedge of a recording image of pixels when the pixels are formed without overlapping thereof.

The recording head may comprise heating elements each of which produces thermal energy for discharging ink in response to an electric current.

Moreover, since one pixel is formed by ink droplets discharged from different orifices, in a portion, where the first image area overlaps with the second image area, unevenness of the image density due to irregularity of orifices of the recording head can be reduced.

In addition, since pixels which determine the image density of the overlapping portion are formed by two processes, and the number of ink droplets which are discharged from a orifice in a vicinity of the edge portion of the recording head for forming a pixel is reduced, so that even though the feed distance of the recording head for sub-scanning fluctuates and then a position, on which ink droplets discharged from an orifice in the vicinity of the edge portion are landed is somewhat shifted, the so-called "black stripe" is hardly generated.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Referring to the accompanying drawings, embodiments of the present invention will be described below.

EMBODIMENT 1

Figure 1:
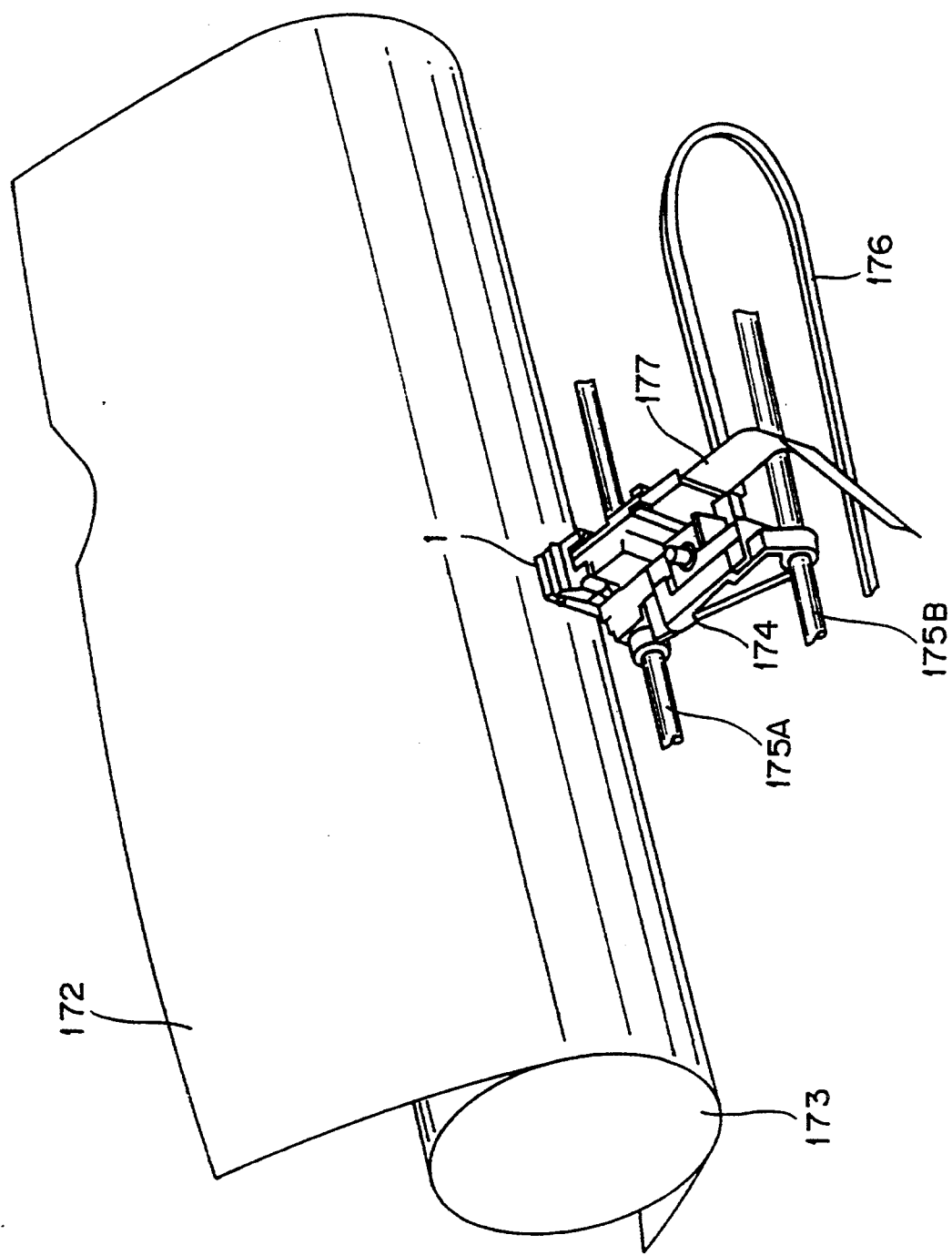
FIG. 1 is a schematic perspective view of an ink-jet recording apparatus of embodiment 1 according to the present invention.

FIG. 1 is a schematic perspective view of an ink-jet recording apparatus of embodiment 1 according to the present invention. In FIG. 1, reference numeral 1 denotes a recording head on which 128 ink orifices are disposed at a density of 16 orifices/mm. Each of the orifices is provided with an electrothermal transducer for generating energy used for discharging ink in an ink path communicating with the orifice. Incidentally, in embodiments described here and hereinafter of the present invention, term "discharging portion", "outlet" or "nozzle" may be used instead of term "orifice". The electrothermal transducer generates heat in response to electric pulses applied thereto and then generates film boiling in ink with this heat, so that ink is discharged from the orifice according to the film boiling. In embodiment 1, the discharging frequency or the driving frequency for driving the electrothermal transducer is 2 kHz.

Reference numeral 174 denotes a carriage for mounting and shifting the recording head 1. The carriage 174 is guided and shifted along two guide shafts 175A and 175B being slidably engaged with the carriage 174. Reference numeral 176 denotes an ink supplying tube which supplies ink from an ink tank (not shown) to the recording head 1. Reference numeral 177 denotes a flexible cable for transmitting driving signals and control signals based on recording data from a control unit of the recording apparatus (not shown) to the recording head driver being provided in a portion of the recording head 1. The ink supplying tube 176 and the flexible cable 177 are made of flexible members so that they can follow the movement of the carriage 174. The carriage 174 is connected to part of a belt (not shown) being stretched in parallel to the guide shafts 175A and 175B for shifting the carriage 174, and can be shifted by the belt driven by a carriage motor (not shown).

Reference numeral 173 denotes a platen whose longitudinal direction is parallel to the guide shafts 175A and 175B. Reference numeral 172 denotes a recording sheet as a recording medium.

The recording head 1 discharges ink in process of the movement of the carriage 174, so that an image area is recorded on a portion of the recording sheet 172 opposite to the orifices.

Figure 2:
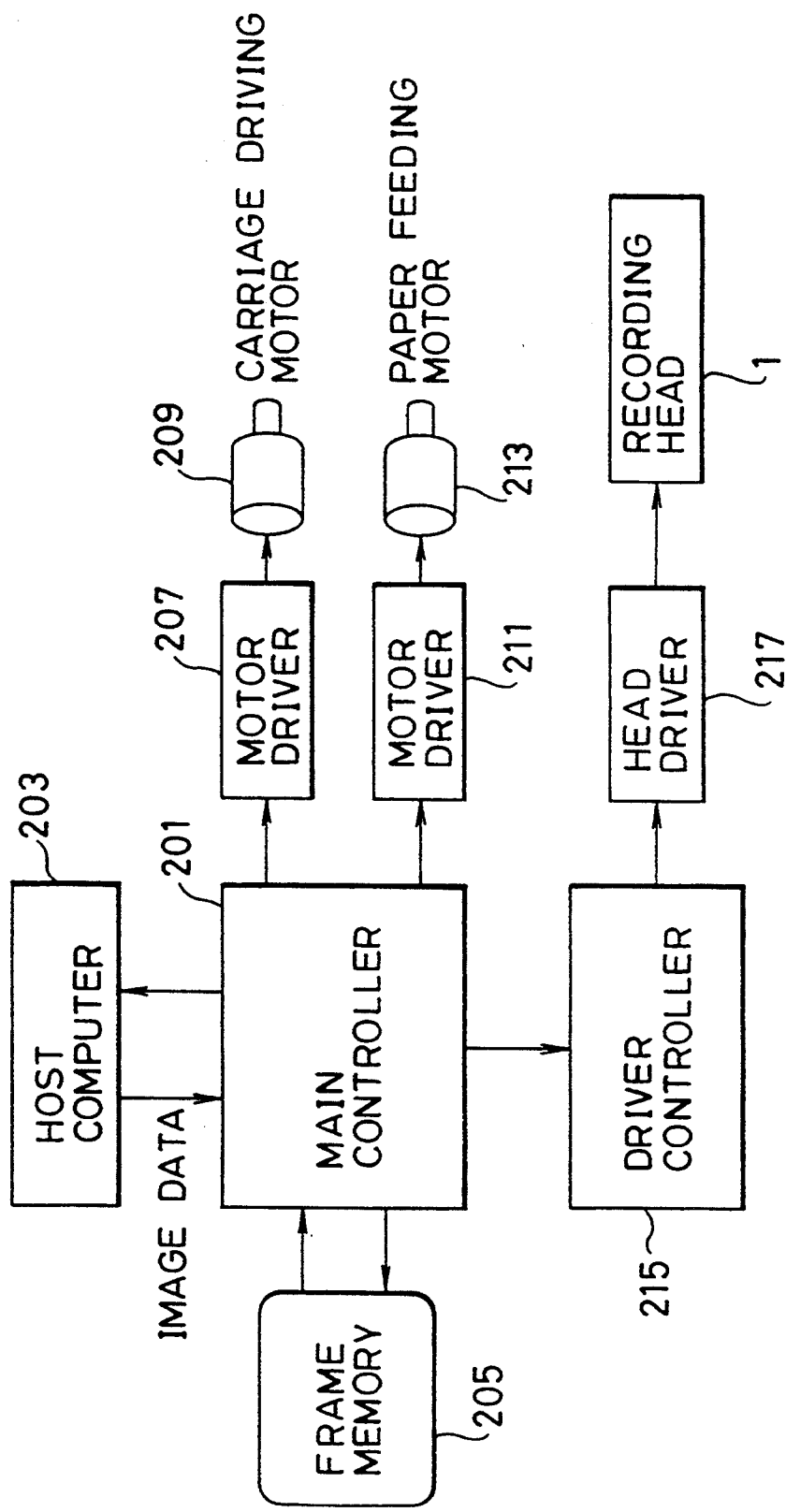
FIG. 2 is a block diagram of a control circuit of the ink-jet recording apparatus shown in FIG. 1.

FIG. 2 is a block diagram showing a control circuit of the recording apparatus shown in FIG. 1. Reference numeral 201 denotes a main controller which controls the whole recording apparatus including the discharging timing, and is usually composed of a one-chip microprocessor or the like with a central processing unit (CPU), a read-only memory which stores a program (program ROM) and a random access memory used for work (work RAM) or the like. The main controller accepts image data signals for indicating the image density of each pixel from a host computer 203, and then stores the signals in units of frames onto a frame memory 205 as a buffer. When images are recorded, that is, when ink is discharged, the main controller 201 controls the drive of a carriage feed motor 209 via a first motor driver 207, and also controls a recording sheet feed motor 213 via a second motor driver 211. The main controller 201 reads image data from the frame memory 205, converts the image data into tone wedge data suitable for the recording apparatus, controls the ink discharging by the recording head 1 (explained hereinafter in more detail) via the driver controller 215 and a head driver 217, and then performs recording of tone wedge image on a recording sheet 172 whereby.

Embodiment 1 for performing 17-tone-wedge image recording by using the above described recording apparatus will be described below.

Figure 3:
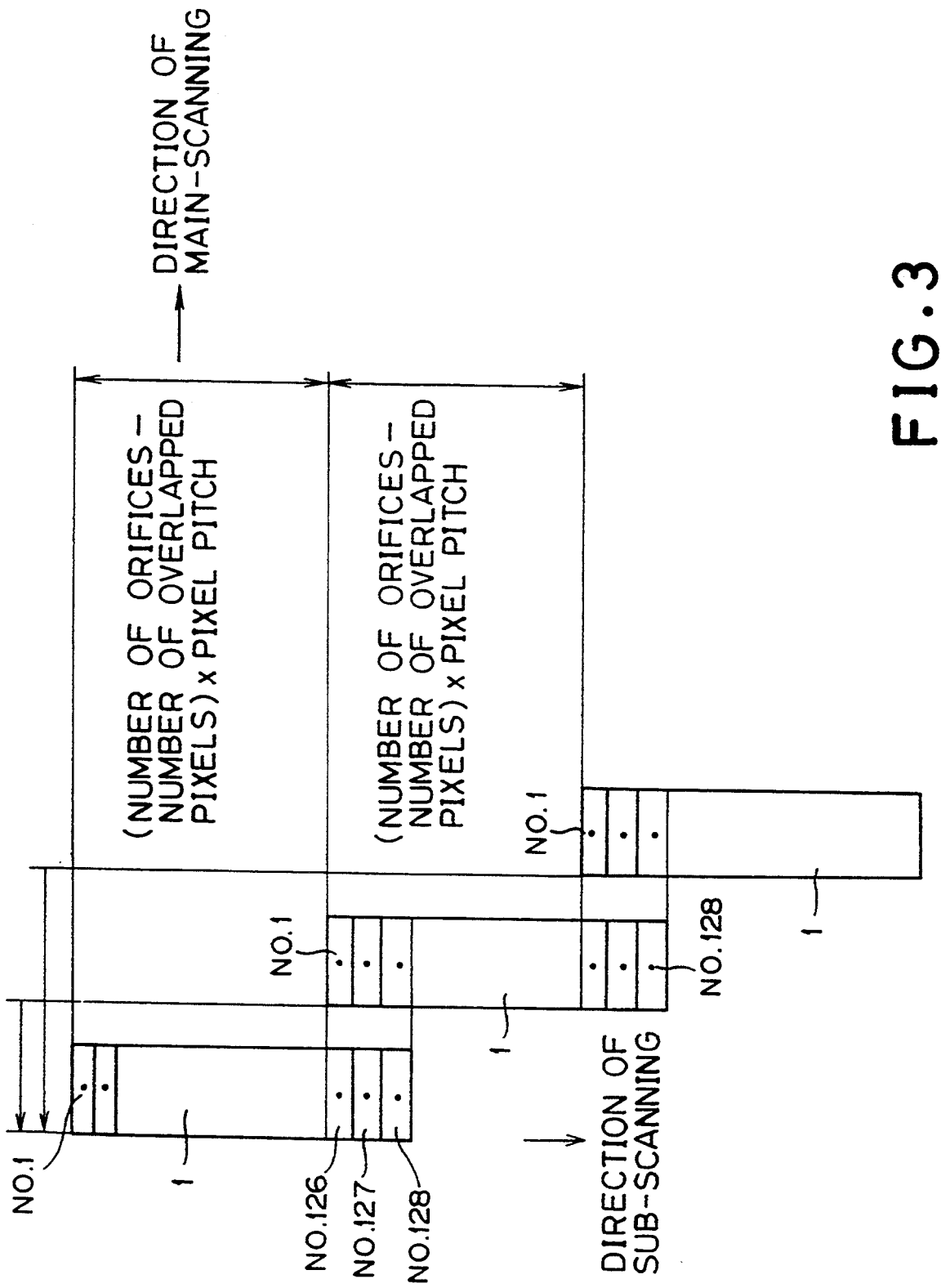
FIG. 3 is a diagram explaining positions of a recording head relative to a recording medium of embodiment 1 according to the present invention shown in FIG. 1.

FIG. 3 is a diagram explaining the positional relationship of the recording head 1 relative to the recording sheet 172 each time the recording head 1 is main-scanned. In FIG. 3, reference numeral 1 denotes a schematic diagram of the recording head 1 on which orifices are disposed in the vertical direction. For the sake of explanation, the orifices are numbered 1, 2, . . . , 128 in the top-to-bottom direction. In FIG. 3, positions of the recording head 1 are assumed to be shifted in the main-scanning direction. But, actually, each left side portion of the recording head 1 at each starting point of main-scanning is placed in the same vertical position. For the sake of explanation, it is assumed that the density off all the images to be recorded on a recording sheet is uniform, that is, each pixel on the sheet is assumed to be generated from the same number (N) of ink droplets.

When recording is performed on the recording sheet at the first main-scanning time, the orifices Nos. 1, 2, . . ., and 128 are used. At this time, as shown in FIG. 4, the numbers of ink droplets discharged from the orifices Nos. 126, 127 and 128 are determined as N×6/8, N×4/8 and N×2/8 respectively for forming the first image area.

Next, as shown in FIG. 3, a recording sheet is moved or sub-scanned upward by 125 pixels so that the orifices Nos. 1, 2, and 3 overlap part of the first image area formed by the orifices Nos. 126, 127 and 128 respectively, in the second main-scanning (in FIG. 3, the recording head 1 is moved downward relative to a recording sheet for convenience), and the orifice No. 1 is placed to the position of the orifice No. 126 in the first main-scanning.

Figure 4:
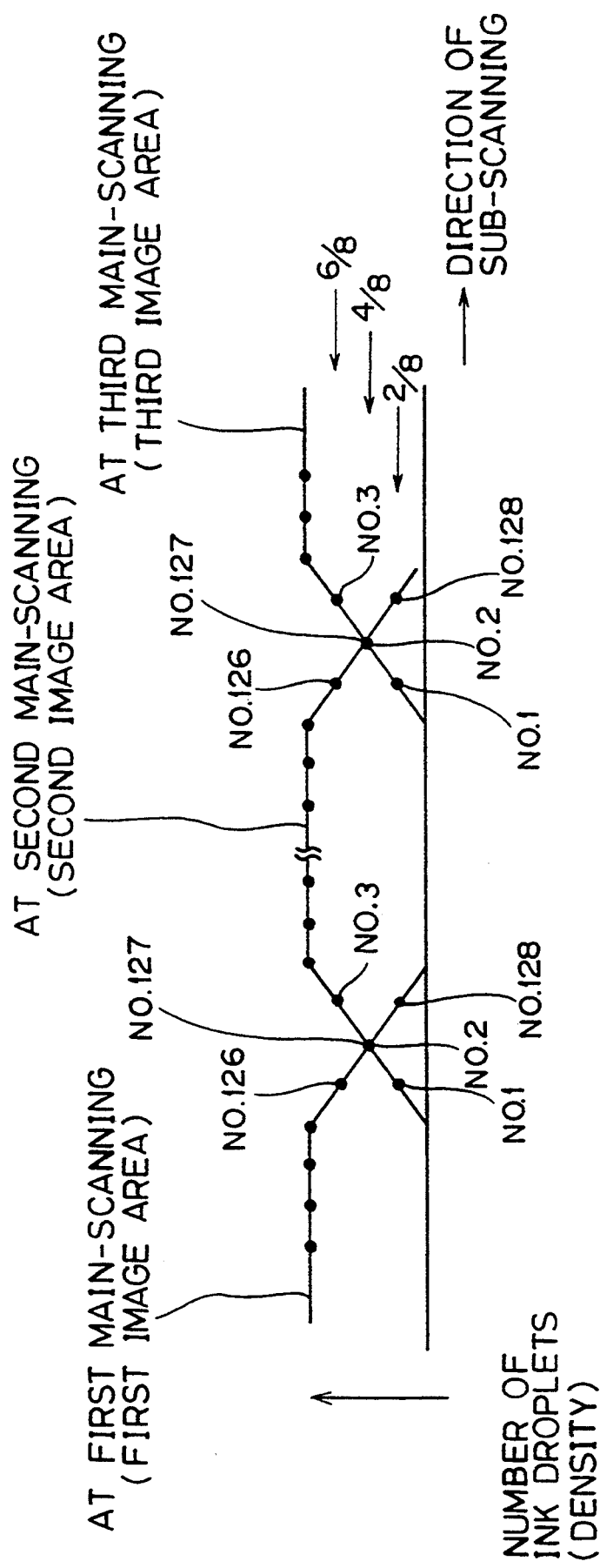
FIG. 4 is a diagram showing the number of ink droplets discharged from each orifice of the recording head of embodiment 1 according to the present invention.
Figure 5:
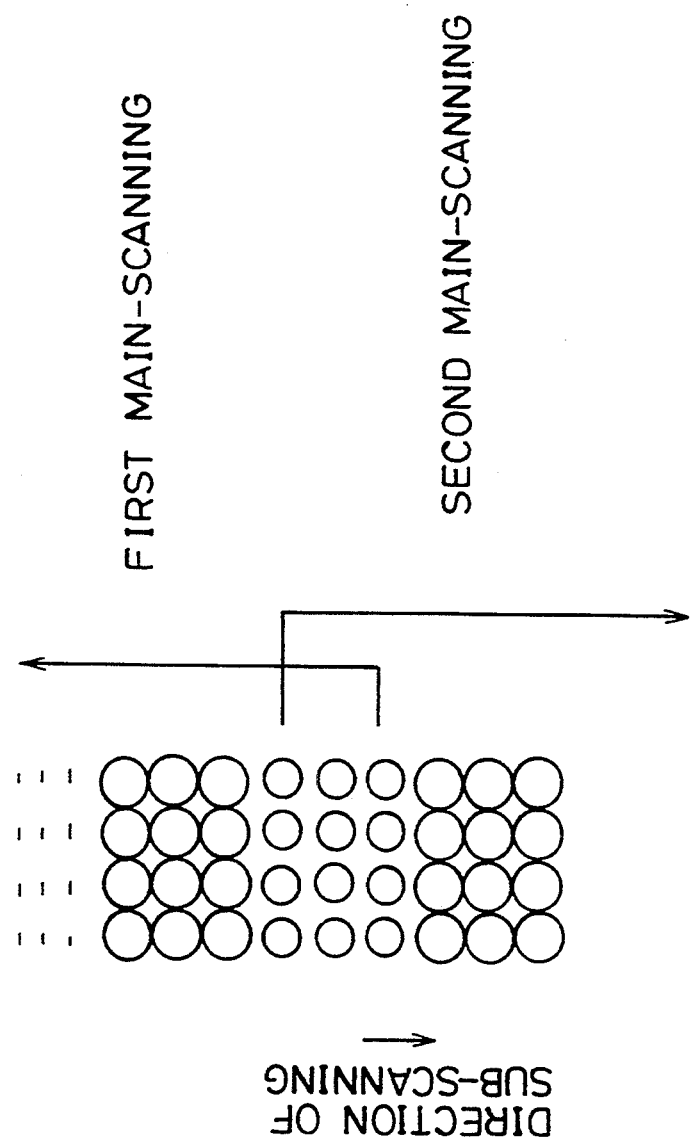
FIG. 5 is a diagram showing a recorded result of embodiment 1 of the present invention.

After the completion of the above sub-scannings, the second image area is recorded at the second main-scanning in such a way that the numbers of ink droplets discharged from the orifices Nos. 1, 2 and 3 are N×2/8, N×4/8 and N'6/8 respectively and the numbers of ink droplets discharged from the orifices Nos. 126, 127 and 128 are N×6/8, N×4/8 and N×2/8, respectively as shown in FIG. 4. The overlapped portion of the first and second image areas is shown in FIG. 5.

Similarly, the recording of image area is repeated to form all the image areas of the images on the sheet. At the lowest image area of the images on the sheet, image recording is performed in such a way that the numbers of ink droplets discharged from the orifices Nos. 126, 127 and 128 are the same as the number of ink droplets discharged from the orifices Nos. 4 to 125.

Moreover, in the above explanation of the image recording, it has been assumed that pixels of recording image are made of the same number of ink droplets. Actually, the number of ink droplets forming each pixel according to image data differs from each other, and the number (N') of ink droplets (image density data) forming each pixel to be overlapped is multiplied by 2/8, 4/8, 6/8 or the like.

Moreover, if a volume of an ink droplet discharged from each orifice in a central portion of the recording head extremely differs from that in edge portions thereof, the values 2/8, 4/8, 6/8 and the like can be adjusted for each recording head according to the volume of an ink droplet.

EMBODIMENT 2

Figure 6:
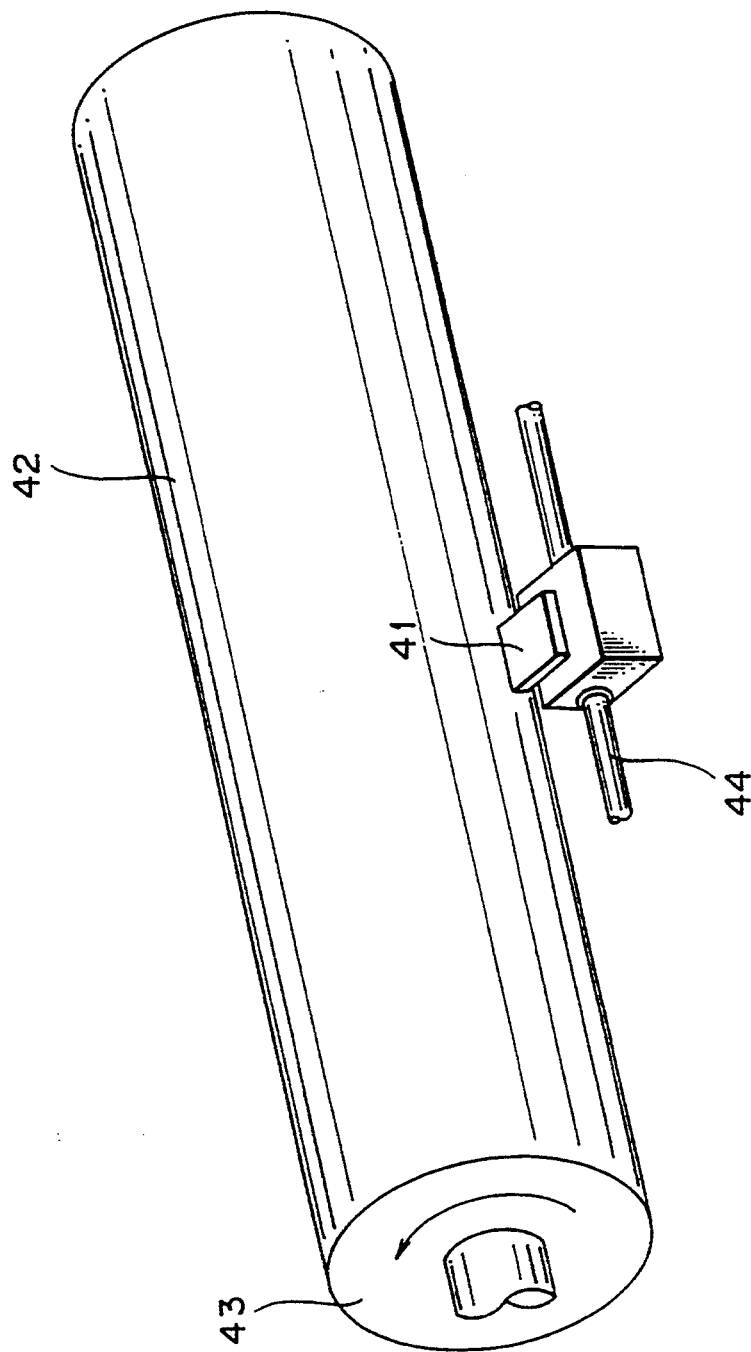
FIG. 6 is a view showing a schematic perspective view of an ink-jet recording apparatus of embodiment 2 according to the present invention.

FIG. 6 is a view showing construction of embodiment 2 of the recording apparatus according to the present invention. Reference numeral 41 denotes an ink-jet recording head having 512 orifices (at a density of 16 orifices/m). The orifices are disposed in the lateral direction of FIG. 6. The recording head 41 is movable along a rail 44. Reference numerals 42 and 43 denote a recording sheet and a drum driven by a motor (not shown) respectively.

The 17-tone-wedge recording can be performed by the recording apparatus of embodiment 2. The number of orifices to perform overlapping image recording is two for each edge portion of the recording head.

Figure 7:
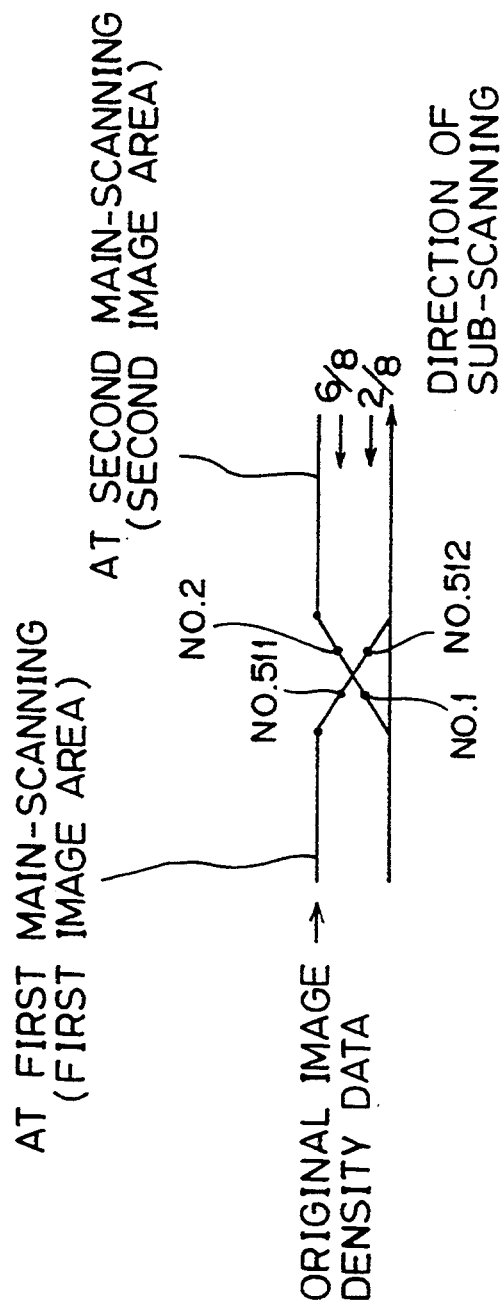
FIG. 7 is a diagram showing the number of ink droplets discharged from each orifice of the recording head of embodiment 2 according to the present invention.

First, the recording head 41 is positioned to the leftmost position in FIG. 6, and as shown in FIG. 7, image density data of the orifices Nos. 511 and 512 are made to be N×6/8 and N×2/8 respectively, and the drum 43 is made to make one revolution to perform the first image recording.

Next, the recording head 41 is shifted to the right by 511 pixel pitches, image density data of the orifices Nos. 1, 2, 511 and 512 are made to be N×2/8, N×6/8, N×6/8 and N×2/8 respectively to perform the second image recording. After the recording head is shifted to the right by 511 pixel pitches as shown above, the drum 43 is made to make one revolution. The above processing is repeated to perform recording of all the image areas. In the rightmost image area of the images on the sheet, like embodiment 1, the above processing is not performed on image density data of the orifices Nos. 511 and 512.

In embodiment 1, there are three orifices to perform overlapping recording for each edge portion of the recording head, and in embodiment 2, there are two orifices to perform the overlapping recording for each edge portion of the recording head. However, the number of orifices performing the overlapping recording is optionally selectable less than the number of all the orifices.

EMBODIMENT 3

Figure 8:
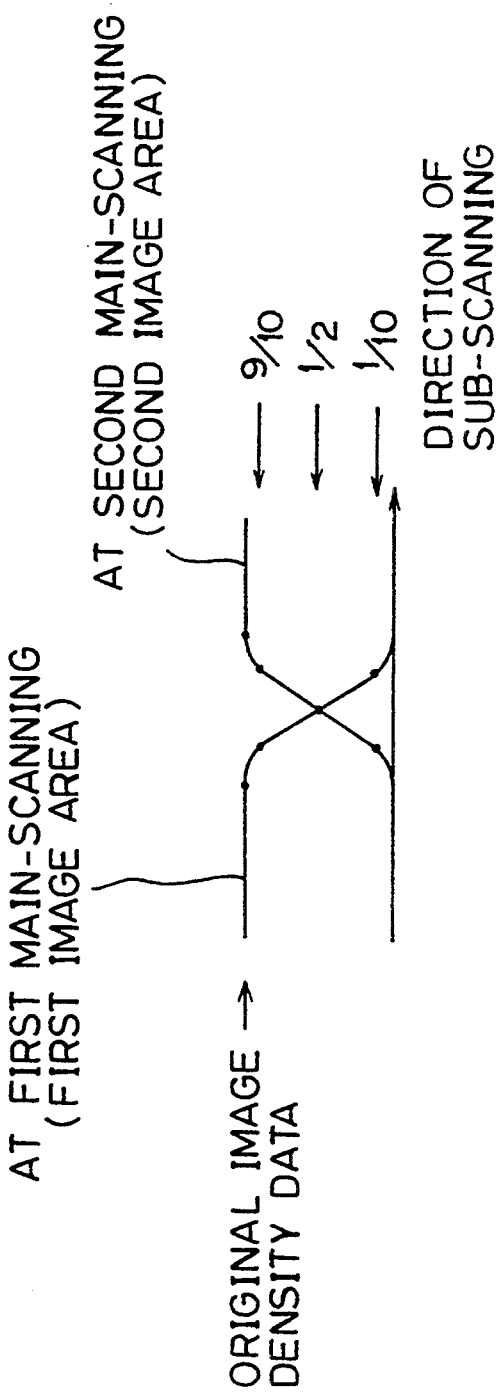
FIG. 8 is a diagram showing the number of ink droplets discharged from each orifice of the recording head of embodiment 3 according to the present invention.

In embodiments 1 and 2, values by which image density data are multiplied, are standardized with respect to $\frac{1}{2}^n$ in order to be easily treated by hardware. However, it is not necessary to standardize the values based on $\frac{1}{2}^n$. For example, as shown in embodiment 3 in FIG. 8, if there are three overlapping orifices, the values can be 1/10, ½ and 9/10. In any case, the total of landed ink droplets may correspond to original image density data.

In the above embodiments, when one pixel is recorded in the overlapping image area, ink droplets are landed on substantially the same area twice at predetermined interval. A plurality of ink droplets to land at a first time or at a second time are defined by a first or second ink droplet group. For example, in FIG. 5, the amount of the first or second ink droplet group landed at the first time or the second time in a central pixel in the overlapping portion of image areas, is about a half of the amount of the ink droplets to be landed on a pixel on non-overlapping portion, so that the spread of the first ink droplet group on a recording medium is smaller than that of ink droplets landed on the pixel on the non-overlapping portion. Moreover, a predetermined time is passed after the first main scanning, and then a previously landed the first ink droplet group is fixed in some degrees. In this state, when a next ink droplet group, the second ink droplet group, is landed on the same pixel on the recording sheet, the final size of the pixel is smaller than the size when all the ink droplets are landed on the pixel at one time. When the number of pixels in the main-scanning direction is extremely large, the previously landed ink droplet group has been mostly fixed and the final size of the pixel becomes smaller than the size corresponding to the original image density data. The reason is that it takes a long time to record image data in the main-scanning direction.

Figure 9:
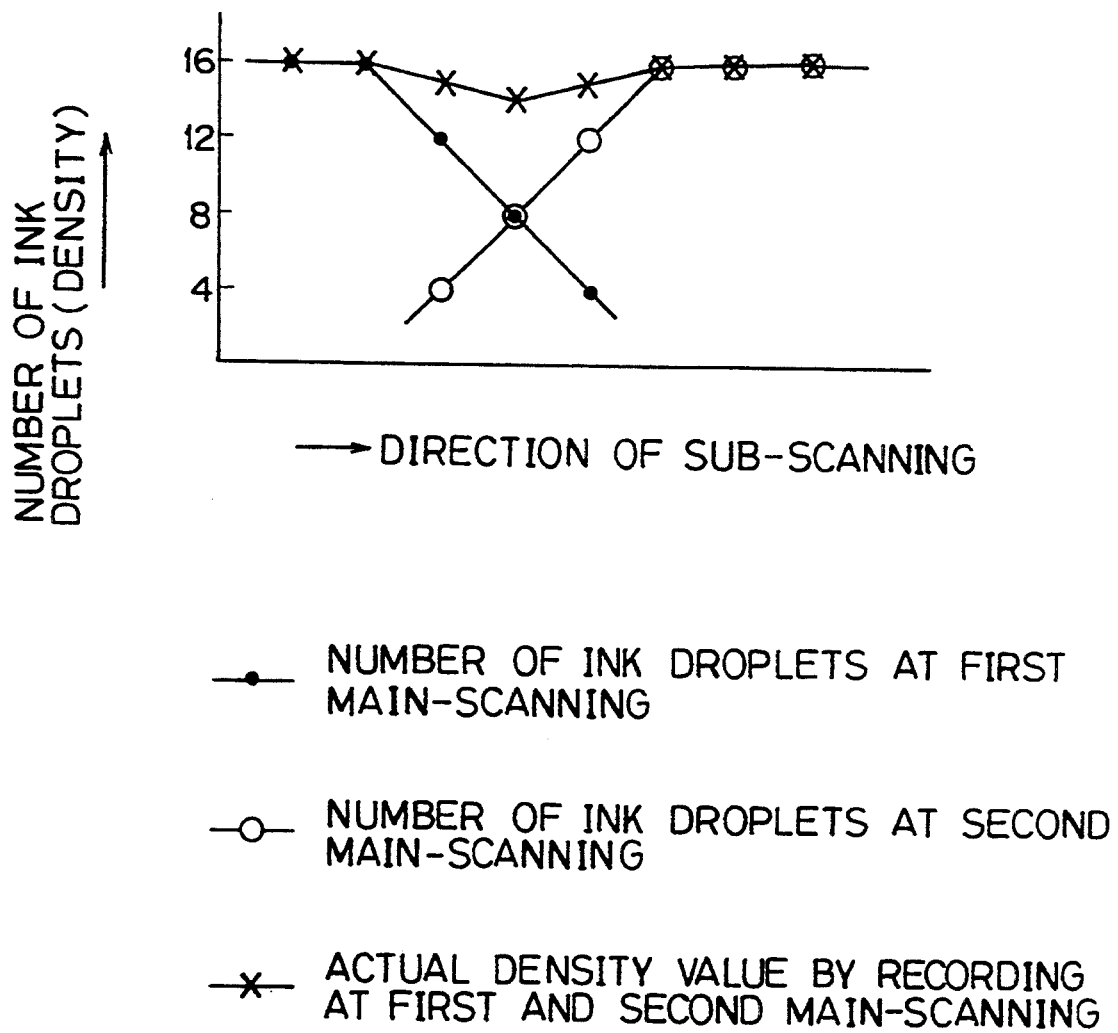
FIG. 9 is a diagram showing the relationship between the number of ink droplets and the image density for each pixel in embodiment 1 of the present invention.

For instance, if it takes a relatively long time to perform one main-scanning due to the large number of pixels to be recorded in the main-scanning direction, the size of pixel in an overlapping portion of image areas shown in FIG. 5 is smaller than the size of another pixel, and the image density of the overlapping portion becomes low. The image density distribution in this case is shown in FIG. 9.

In the embodiment described below, when a dot formed by landing a first ink droplet group on a recording medium portionally overlaps with a dot formed by landing a second ink droplet group on the recording medium, the size of one pixel formed by the dots is made larger by shifting a position of the landed first ink droplet from a position of the landed second ink droplet. This can reduce unevenness of the image density in the overlapping portion of the image areas.

EMBODIMENT 4

Figure 10:
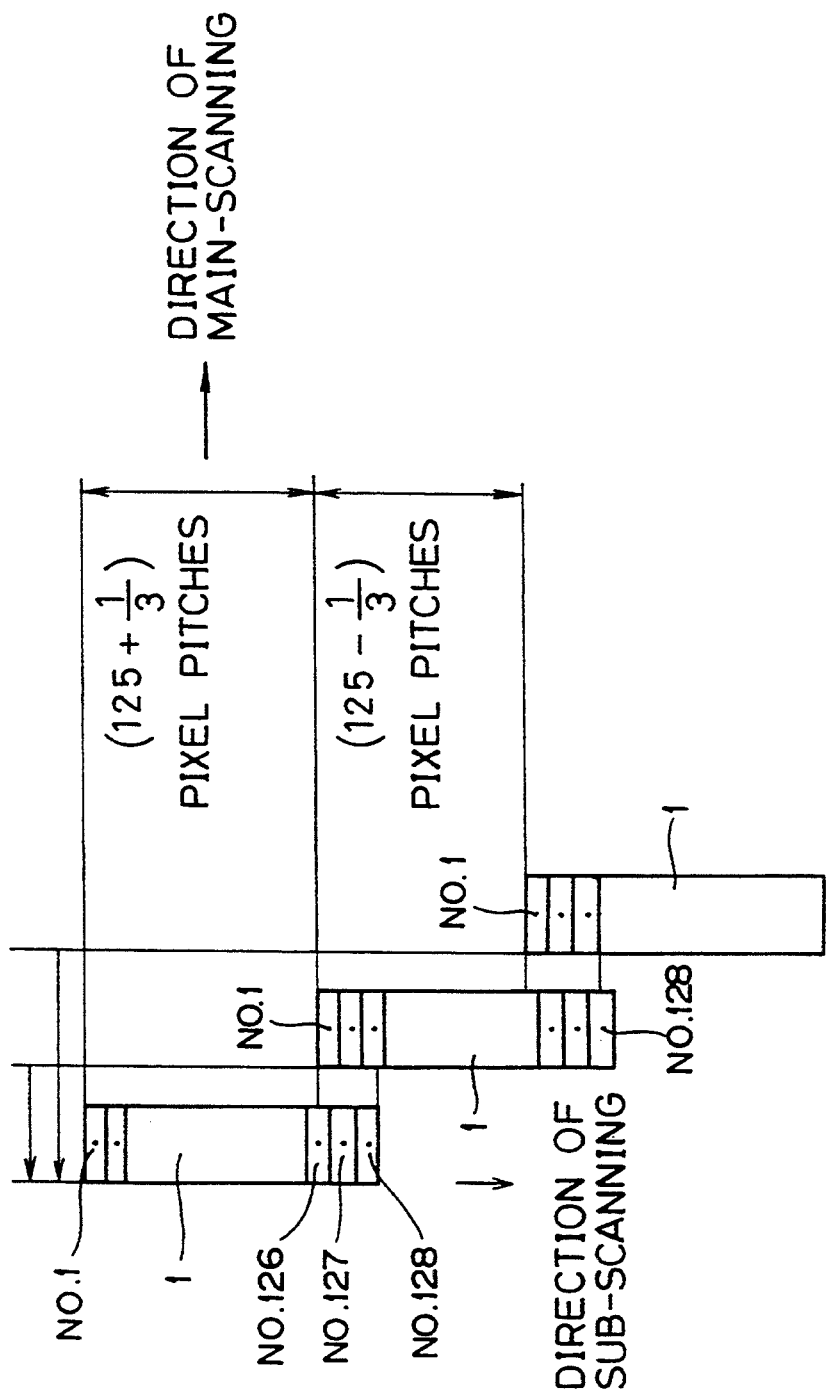
FIG. 10 is a diagram explaining positions of the recording head relative to a recording medium of embodiment 4 according to the present invention.

In embodiment 4, 17-tone-wedge recording is performed by using the ink-jet recording apparatus shown in FIG. 1. FIG. 10 is a schematic diagram for explaining a recording method of embodiment 4, and like reference numerals designate like parts in FIGS. 3 and 10.

Image area recording will be described below in which the number of orifices for recording an overlapping portion of the two image areas is three for each edge portion of the recording head and the highest image density of the overlapping area is formed by 16 ink droplets.

When recording is performed on a recording sheet, the orifices Nos. 1 to 128 are used and the orifices 126, 127 and 128 discharge 12, 8 and 4 ink droplets respectively.

Next, the recording sheet is moved or sub-scanned upward by 125 plus ⅓ pixel pitches (for convenience, the recording head 1 is moved downward relative to the recording sheet in FIG. 10).

Moreover, the numbers of ink droplets discharged from the orifices Nos. 1, 2 and 3 are 4, 8 and 12, and the numbers of ink droplets discharged from the orifices Nos. 126, 127 and 128 are 12, 8 and 4 respectively.

Next, the recording sheet is moved upward by 125 minus ⅓ pixel pitches and the same numbers of ink droplets as described above are discharged on the recording sheet to perform recording.

The above described operations are alternately repeated and finally all the image areas are formed.

Figure 11:
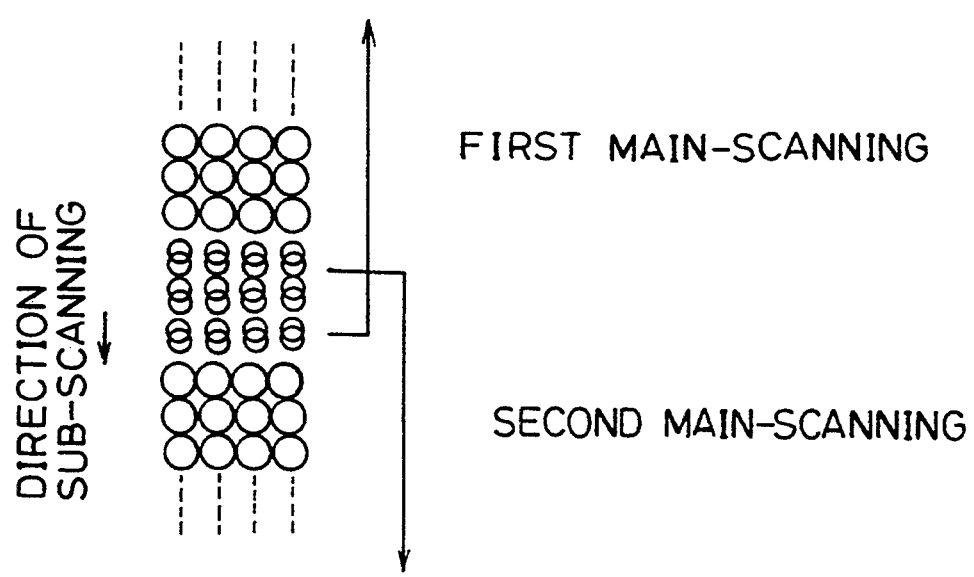
FIG. 11 is a diagram showing a recorded result of embodiment 4 of the present invention.
Figure 12:
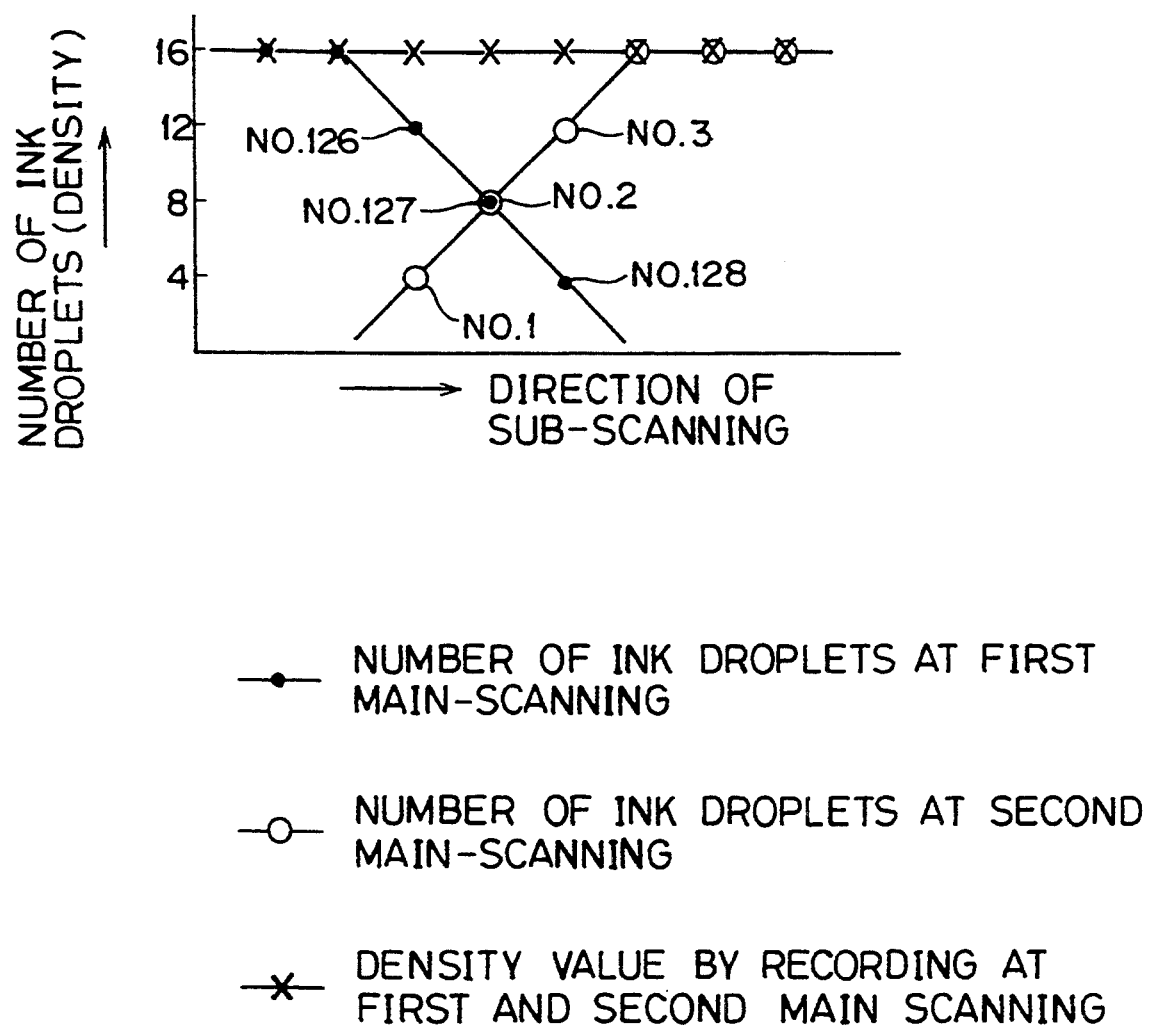
FIG. 12 is a diagram showing the relationship between the number of ink droplets and the image density for each pixel in embodiment 4 of the present invention.

As shown in FIG. 11, the area of pixels forming the overlapping portion between a first image area and a second image area can be widened by the above described recording method. Consequently, as shown in FIG. 12, the area of pixel forming the overlapping portion can be made approximately equal to an area of pixel forming another portion edge of the image area, and unevenness of the image density generated in the overlapping area can be markedly reduced.

EMBODIMENT 5

In embodiment 5, five-tone-wedge recording is performed by using the ink-jet recording apparatus in FIG. 6. However, in embodiment 5, 128 orifices 16 orifices/mm) are disposed in the lateral direction of the recording head.

The number of orifices which record an overlapping portion is two for each edge portion of the recording head, and the highest image density of a pixel in the overlapping portion is formed by four ink droplets.

First, the recording head 41 is positioned to the leftmost position in FIG. 6. While the numbers of ink droplets discharged from the orifices Nos. 127 and 128 are 3 and 1 respectively, recording is performed during rotating the drum 43. At this time, a recording start position in the direction of the drum revolution is defined as H.

Figure 13:
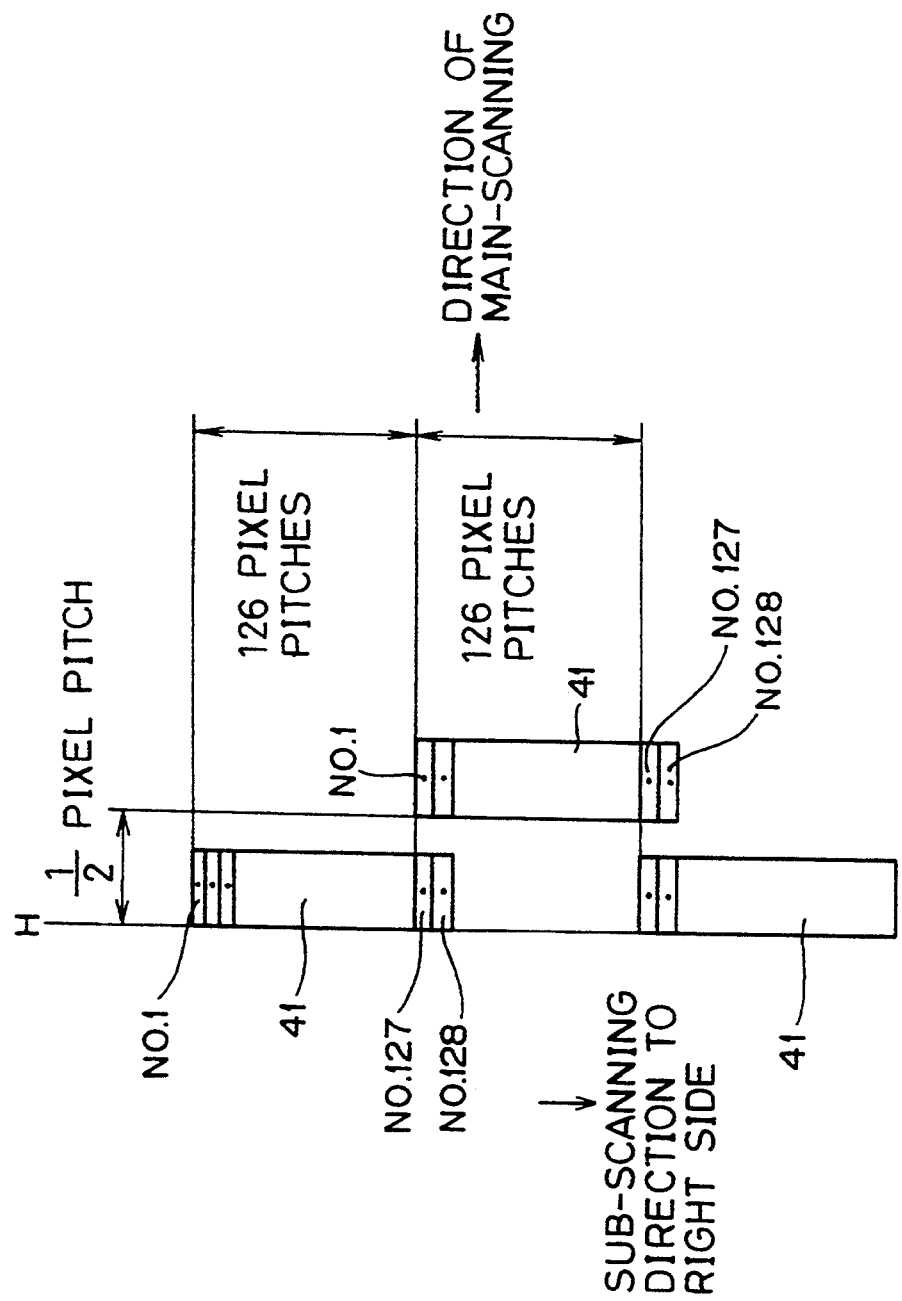
FIG. 13 is a diagram explaining positions of the recording head relative to a recording medium of embodiment 5 according to the present invention.
Figure 14:
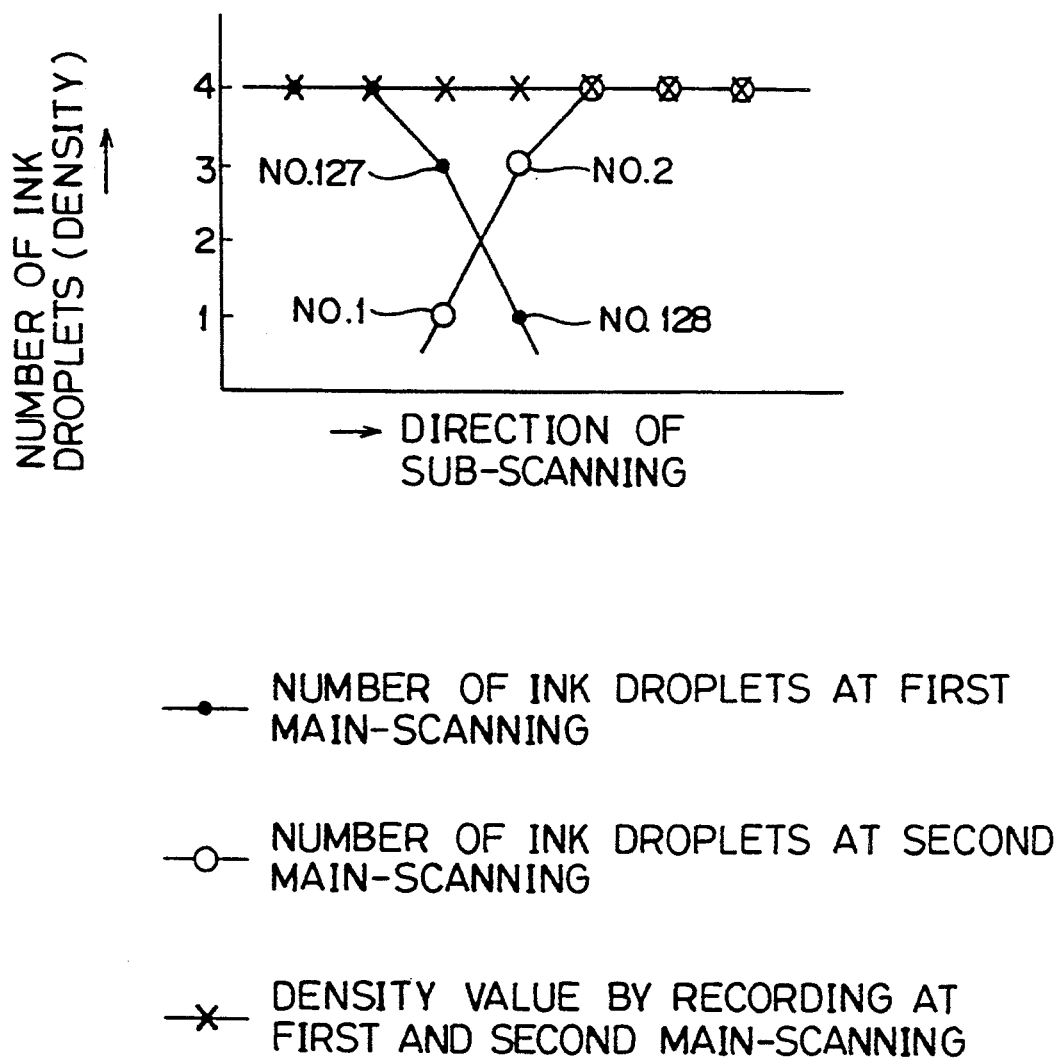
FIG. 14 is a diagram showing the relationship between the number of ink droplets and the image density for each pixel in embodiment 5 of the present invention.

Next, the recording head 41 is shifted to the right by 126 pixel pitches as shown in FIG. 13. After this sub-scanning, as shown in FIG. 14, the numbers of ink droplets discharged from the orifices Nos. 1 and 2 are one and three, and the numbers of ink droplets discharged from the orifices Nos. 127 and 128 are three and one respectively so as to record a second image area. At this time, as shown in FIG. 13, the recording start position in the direction of the drum revolution is shifted from the record starting position H by 0.5 pixel pitch so as to start recording.

After the second image area has been formed, the recording head 41 is shifted to the right by 126 pixel pitches as shown in FIG. 13, and then, recording is performed at the recording start position H with the same numbers of ink droplets as described above.

Figure 15:
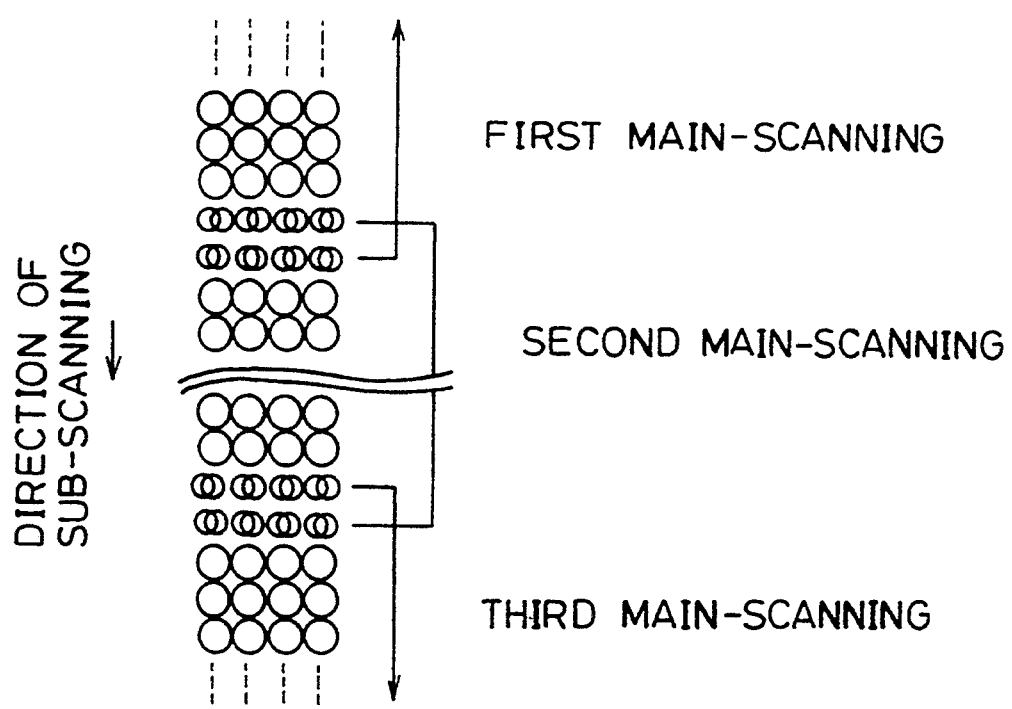
FIG. 15 is a diagram showing a recorded result of embodiment 5 of the present invention.

The above described operations are repeated to perform recording of all the image areas. FIG. 15 illustrates the recording result of pixels recorded by the recording apparatus of embodiment 5.

EMBODIMENT 6

Figure 16:
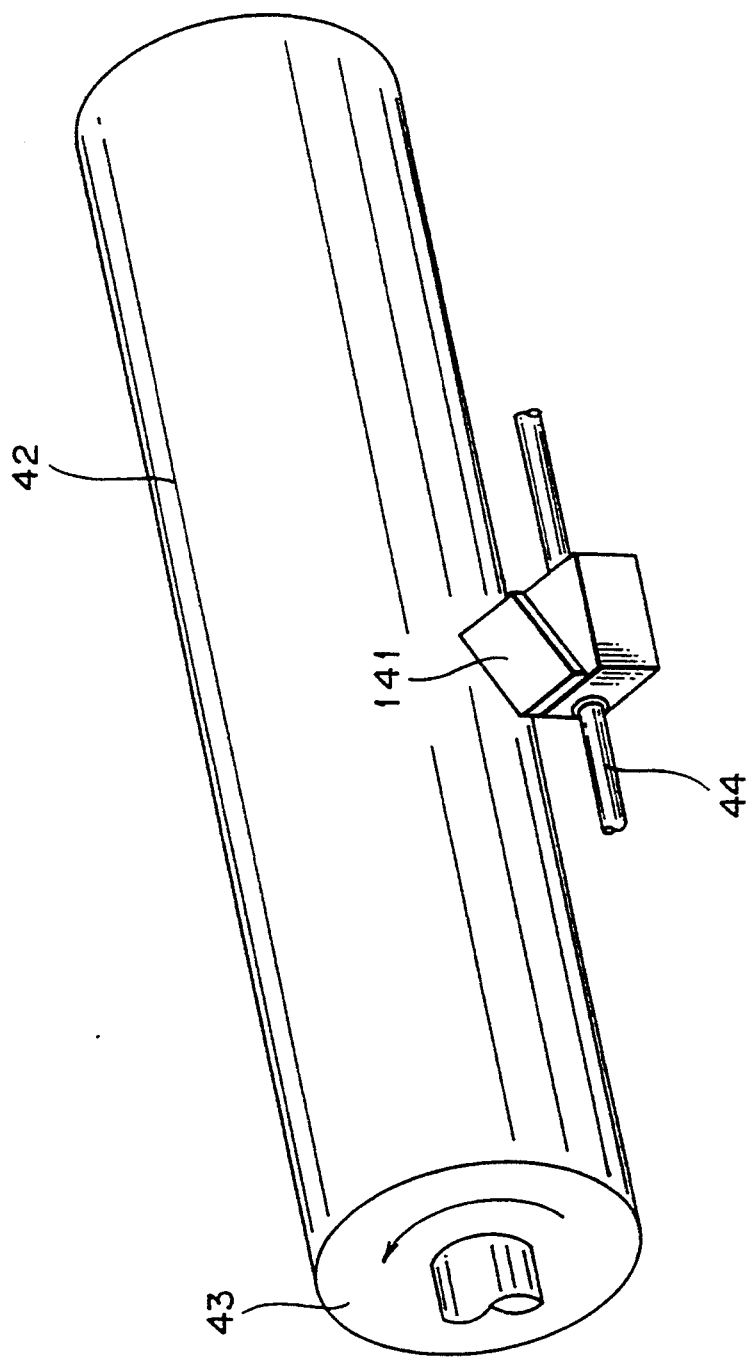
FIG. 16 is a view showing a schematic perspective view of an ink-jet recording apparatus of embodiment 6 according to the present invention.
Figure 17:
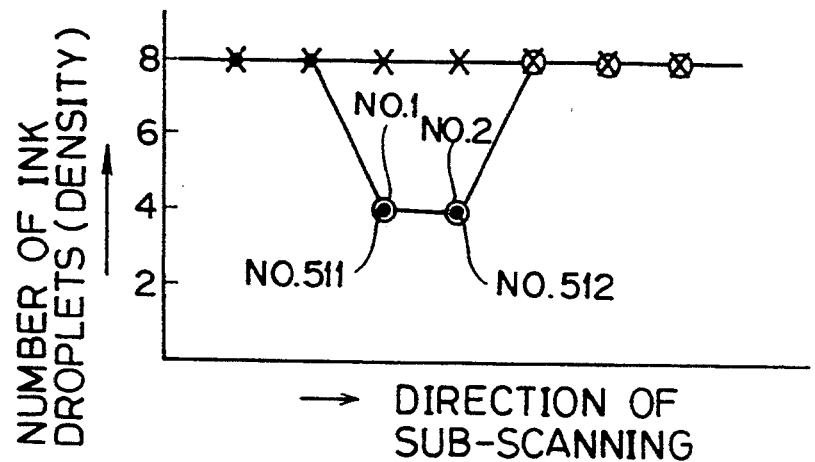
FIG. 17 is a diagram showing the relationship between the number of ink droplets and the image density for each pixel in embodiment 6 according to the present invention.

FIG. 16 is the construction of an ink-jet recording apparatus of embodiment 6 according to the present invent ion. Reference numeral 141 denotes an ink-jet recording head having 512 orifices (16 orifices/mm), and being disposed obliquely to the direction of revolution of the drum 41. The other construction is similar to the recording apparatus shown in FIG. 6.

The recording head 141 is first located on the right side of the drum 42, and is shifted from the right side to the left side by 510 plus ½ pixel pitches during one revolution of the drum 43. That is, sub-scanning of the recording head 141 has been completed when main-scanning in which the drum 43 makes one revolution is completed.

In embodiment 6, orifices are numbered 1, 2, . . . , and 512 from the right side in FIG. 16, the number of orifices which perform overlapping portion are two for each edge portion of the recording head, and a pixel in the overlapping portion is generated by eight ink droplets.

First, when the first image area is formed or until the drum 43 makes a first revolution, eight ink droplets are discharged from orifices Nos. 1 to 510 and four ink droplets are discharged from orifices Nos. 511 and 512 so as to perform recording.

Thus, the first image area is formed, and the drum 43 makes one revolution so as to finish recording of the first image area. When the recording has been completed and the drum starts making a second revolution, the recording head 141 has been shifted to the left by 510 plus ½ pixel pitches, the orifice No. 1 is shifted to the left by ½ pixel pitch from a position in which orifice No. 511 was located first, and orifice No. 2 is shifted to the left by ½ pixel pitch from a position in which orifice 512 was located first.

Next, the numbers of ink droplets discharged from orifices Nos. 1, 2, 511 and 512 are four, and the second image area and the latter are formed.

When the last image area is formed, the numbers of ink droplets discharged from only orifices Nos. 1 and 2 are four. Thus, recording of all the image areas has been completed.

Figure 18:
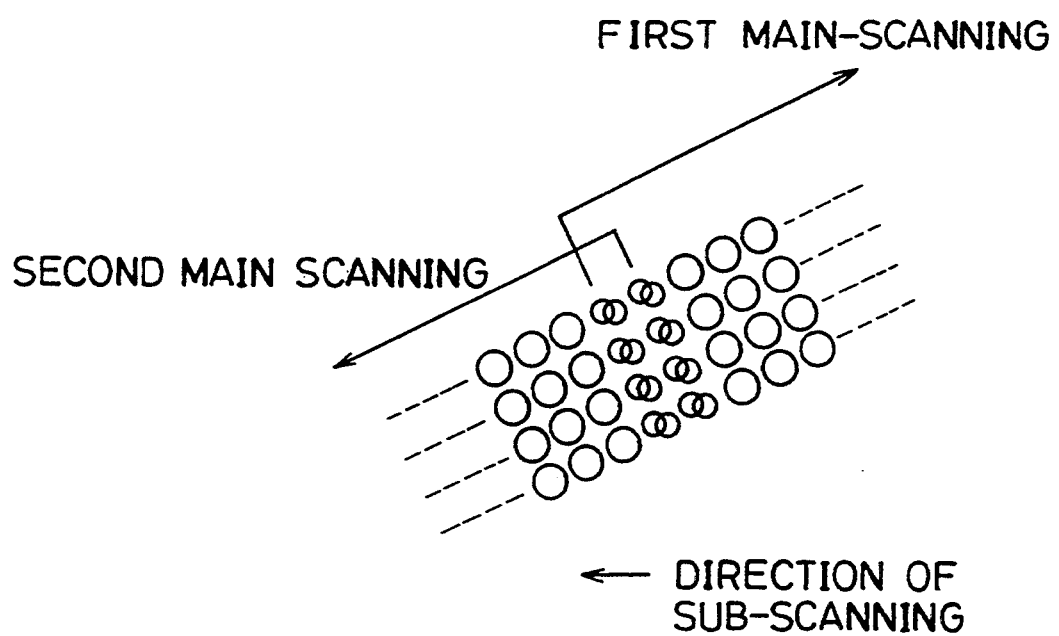
FIG. 18 is a diagram showing a recorded result of embodiment 6 of the present invention.

The state of pixels in a boundary between each image area in embodiment 6 is shown in FIG. 18.

According to the present invention, the unevenness of image density, a "black stripe" or a "white stripe" which is generated in a vicinity of a boundary between each recorded image area at each main-scanning, is markedly reduced by simple control, and hence the image quality is improved in the vicinity of the boundary between each image area.

Further Description

The present invention achieves distinct effect when applied to a recording head or a recording apparatus which has means for generating thermal energy such as electrothermal transducers or laser light, and which causes changes in the ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are produced in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the thermoelectric transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to mounted on a recording apparatus can be also changed. For example, only one recording head corresponding to a single color ink, or a plurality of recording heads corresponding to a plurality of inks different color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, as an output device of a facsimile apparatus having transmission and receiving functions, and as an output device of an optical disc apparatus for recording and/or reproducing information onto and/or from an optical disc. These apparatuses require means for outputting processed information in the form of hard copy.

The invention has been described in detail with respect to preferred embodiments, and it will new be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink-jet recording method, in which a plurality of ink droplets for each pixel are overlapped and landed on a recording medium to form each pixel by a recording head with a plurality of ink discharging portions arranged thereon in a discharging portion arrangement and a tone wedge of an image data is represented by controlling an area of said each pixel on a basis of a number of the plurality of ink droplets, said method comprising the steps of:

recording one image area by main-scanning of said recording head and said recording medium relative thereto in a direction other than a direction of said ink discharging portion arrangement;

sub-scanning said recording head and said recording medium relative thereto in a direction perpendicular to the direction of said main-scanning; and recording a following image area by main-scanning said recording head and said recording medium relative thereto, wherein said sub-scanning is performed in a manner that part of said one image area overlaps part of said following image area, and a number of ink droplets discharged from at least two ink discharging portions of said plurality of ink discharging portions, which relates to recording of pixels included in an overlapping portion of said one and following image areas, is modified when said one and following image areas are recorded, so that the tone wedge of a recording image of said pixels included in said overlapping portion is represented by a total number of ink droplets being discharged when said one and following image areas are recorded and said number of ink droplets discharged from said at least two discharging portions for recording said overlapping portion, is gradually decreased toward a discharging portion disposed in an edge portion of said recording head when said one image area is recorded, and is gradually increased from a discharging portion disposed in an edge portion of said recording head when said following image area is recorded, so that said total number of discharged ink droplets is obtained.

2. An ink-jet recording method as claimed in claim 1, further comprising the step of adjusting a discharge position of said recording head relative to said recording medium for each recording step so that each pixel included in said overlapping portion is formed by partially overlapping one image portion being formed by a group of ink droplets discharged when said one image area is recorded with a following image portion being formed by a group of ink droplets discharged when said following image area is recorded, by less than a pixel pitch.

3. An ink-jet recording method as claimed in claim 2, wherein said adjusting step comprises adjusting an amount of sub-scanning.

4. An ink-jet recording method as claimed in claim 2, wherein said adjusting step comprises adjusting a record starting position of said main-scanning.

5. An ink-jet recording method as claimed in claim 1, wherein said total number of ink droplets is a number of ink droplets determined to obtain a predetermined tone wedge of the recording image of pixels when said pixels are formed without overlapping thereof.

6. An ink-jet recording method as claimed in claim 1, wherein said recording head comprises heating elements each of which produces thermal energy for discharging ink in response to an electric current.

7. An ink-jet recording method, in which a plurality of ink droplets for each pixel are overlapped and landed on a recording medium to form each pixel by a recording head with a plurality of ink discharging portions arranged thereon in an ink discharging portion arrangement and a tone wedge of image data is represented by controlling an area of said each pixel on a basis of a number of the plurality of ink droplets, said method comprising the steps of:

recording a one image area by main-scanning of said recording head and said recording medium relative thereto in a direction other than a direction of said ink discharging portion arrangement;

sub-scanning said recording head and said recording medium relative thereto in a direction different from the direction of said main-scanning, by a length less than a width of said one image area; and recording a following image area by main-scanning said recording head and said recording medium relative thereto, whereby said one and following image areas are partially overlapped with each other, wherein a number of discharging portions for recording pixels included in an overlapping portion of said one and following image areas is two or more, a number of ink droplets being discharged from said two or more discharging portions for recording said overlapping portion, is gradually decreased toward a discharging portion disposed in an edge portion of said recording head when said one image area is recorded, and is gradually increased from said discharging portion disposed in said edge portion of said recording head when said following image area is recorded, so that a total number of discharged ink droplets, being discharged when said one and following image areas are recorded is obtained.

8. An ink-jet recording method as claimed in claim 7, wherein said recording head comprises heating elements each of which produces thermal energy for discharging ink in response to an electric current.

9. An ink-jet recording method, in which at least one ink droplet for each pixel is landed on a recording medium to form each pixel by a recording head with a plurality of ink discharging portions arranged thereon in an ink discharging portion arrangement and a tone wedge of an image data is represented by controlling an area of said each pixel on a basis of a quantity of ink based on density data, said method comprising the steps of:

recording one image area by main-scanning of said recording head and said recording medium relative thereto in a direction other than a direction of said ink discharging portion arrangement;

sub-scanning said recording head and said recording medium relative thereto in a direction perpendicular to a direction of said main-scanning; and recording a following image area by main-scanning said recording head and said recording medium relative thereto, wherein said sub-scanning is performed in a manner that part of said one image area overlaps part of said following image area and said density data corresponding to at least two discharging portions of said plurality of discharging portions, which relates to recording of pixels included in an overlapping portion of said one and following image areas, is modified when said one and following image areas are recorded, so that the tone wedge of a recording image of said pixels included in said overlapping portion is represented by a total of the quantity of ink discharged when said one and following image areas are recorded and said density data corresponding to said at least two discharging portions for recording said overlapping portion, is gradually decreased toward a discharging portion disposed in an edge portion of said recording head when said one image area is recorded, and is gradually increased from said discharging portion disposed in said edge portion of said recording head when said following image area is recorded, so that said total of ink quantity is obtained.

10. An ink-jet recording method as claimed in claim 9, wherein a number of ink droplets being landed on one pixel is controlled based on said density data.

11. An ink-jet recording method as claimed in claim 10, wherein a total number of ink droplets is a number of ink droplets being determined to obtain a predetermined tone wedge of a recording image of pixels when said pixels are formed without overlapping thereof.

12. An ink-jet recording method as claimed in claim 9, wherein said recording head comprises heating elements each of which produces thermal energy for discharging said ink in response to an electric current.

13. An ink-jet recording method as claimed in claim 9, further comprising the step of adjusting a discharge position of said recording head relative to said recording medium for each recording step so that each pixel included in said overlapping portion is formed by partially overlapping one image portion being formed by a group of ink droplets discharged when said one image area is recorded and following image portion being formed by a group of ink droplets discharged when said following image area is recorded, by less than a pixel pitch.

14. An ink-jet recording method as claimed in claim 13, wherein said adjusting step comprises adjusting an amount of sub-scanning.

15. An ink-jet recording method as claimed in claim 13, wherein said adjusting step comprises adjusting a record starting position of said main-scanning.

16. An ink-jet recording method as claimed in claim 9, wherein said total of ink quantity is density data being determined to obtain a predetermined tone wedge of the recording image of pixels when said pixels are formed without overlapping thereof.

* * * * *

UNITED STATES PATENT AND TRADEMARK OFFICE
CERTIFICATE OF CORRECTION

PATENT NO. : 5,384,587
DATED : January 24, 1995
INVENTOR(S) : Shinji TAKAGI, et al.

It is certified that error appears in the above-indentified patent and that said Letters Patent is hereby corrected as shown below:

<u>AT [57] ABSTRACT</u>:

Line 14, "example," should read --for example,--.

<u>COLUMN 1</u>:

Line 43, "above described" should read --above-described--.

<u>COLUMN 3</u>:

Line 9, "off" should read --of--;
    Line 18, "off" should read --of--.

<u>COLUMN 4</u>:

Line 20, "forth" should read --fourth--;
    Line 26, "an" (second occurrence) should read --a--;
    Line 32, "port ion" should read --portion--.

<u>COLUMN 5</u>:

Line 29, "a" (first occurrence) should read --an--.

UNITED STATES PATENT AND TRADEMARK OFFICE
CERTIFICATE OF CORRECTION

PATENT NO. : 5,384,587            Page 2 of 4
DATED : January 24, 1995
INVENTOR(S) : Shinji TAKAGI, et al.

It is certified that error appears in the above-indentified patent and that said Letters Patent is hereby corrected as shown below:

COLUMN 6:

Line 42, "term" should read --the term--;
    Line 43, "term" should read --the term--.

COLUMN 7:

Line 32, "whereby." should read --thereby.--;
    Line 34, "above described" should read --above-described--;
    Line 48, "off" should read --of--.

COLUMN 8:

Line 1, "sub-scannings," should read --sub-scanning,--;
    Line 5, "N'6/8" should read --N×6/8--;
    Line 37, "16 orifices/m)." should read --16 orifices/mm).--.

UNITED STATES PATENT AND TRADEMARK OFFICE
CERTIFICATE OF CORRECTION

PATENT NO. : 5,384,587
DATED : January 24, 1995
INVENTOR(S) : Shinji TAKAGI, et al.

It is certified that error appears in the above-indentified patent and that said Letters Patent is hereby corrected as shown below:

COLUMN 10:

Line 20, "above described" should read --above-described--;
      Line 24, "above de-" should read --above-de- --;
      Line 35, "orifices 16" should read --orifices (16--;
      Line 65, "above described" should read --above-described--.

COLUMN 11:

Line 5, "invent ion." should read --invention.--;
      Line 48, " stripe" " (second occurrence) should read --stripe",--.

COLUMN 12:

Line 64, "mounted" should read --be mounted--;
      Line 68, "different" should read --different in--.

UNITED STATES PATENT AND TRADEMARK OFFICE
CERTIFICATE OF CORRECTION

PATENT NO. : 5,384,587      Page 4 of 4
DATED : January 24, 1995
INVENTOR(S) : Shinji TAKAGI, et al.

It is certified that error appears in the above-indentified patent and that said Letters Patent is hereby corrected as shown below:

COLUMN 13:

Line 50, "new" should read --now--.

COLUMN 16:

Line 38, "following" should read --a following--.

Signed and Sealed this

Twenty-third Day of May, 1995

Attest:

BRUCE LEHMAN

*Attesting Officer*      *Commissioner of Patents and Trademarks*